United States Patent
Park et al.

(10) Patent No.: US 10,177,652 B2
(45) Date of Patent: Jan. 8, 2019

(54) POWER SUPPLY DEVICE FOR SUB-MODULE CONTROLLER OF MMC CONVERTER

(71) Applicant: HYOSUNG HEAVY INDUSTRIES CORPORATION, Seoul (KR)

(72) Inventors: Jung-Soo Park, Uiwang-si (KR); Hong-Ju Jung, Seoul (KR); June-Sung Kim, Anyang-si (KR); Doo-Young Lee, Anyang-si (KR); Jong-Yun Choi, Hwaseong-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 15/538,889

(22) PCT Filed: Dec. 29, 2015

(86) PCT No.: PCT/KR2015/014402
§ 371 (c)(1),
(2) Date: Jun. 22, 2017

(87) PCT Pub. No.: WO2016/108575
PCT Pub. Date: Jul. 7, 2016

(65) Prior Publication Data
US 2018/0006551 A1 Jan. 4, 2018

(30) Foreign Application Priority Data
Dec. 29, 2014 (KR) .................. 10-2014-0192750

(51) Int. Cl.
*H02M 3/06* (2006.01)
*H02M 7/19* (2006.01)
(Continued)

(52) U.S. Cl.
CPC ............... *H02M 3/06* (2013.01); *H02M 1/08* (2013.01); *H02M 7/19* (2013.01); *H02M 7/49* (2013.01);
(Continued)

(58) Field of Classification Search
CPC ............. H02M 3/06; H02M 7/48; H02M 7/49
(Continued)

(56) References Cited

U.S. PATENT DOCUMENTS

2014/0203645 A1    7/2014  Leu et al.

FOREIGN PATENT DOCUMENTS

EP          2458726 A1    5/2012
EP          2549634 A1    1/2013
(Continued)

OTHER PUBLICATIONS

English Translation of JP2013-255422; obtained from J-PlatPat; Narushima et al.; Dec. 19, 2013.*

*Primary Examiner* — John Poos
(74) *Attorney, Agent, or Firm* — Novick, Kim & Lee, PLLC; Jae Youn Kim

(57) ABSTRACT

Disclosed herein is a power supply apparatus for a sub-module controller of a Modular Multilevel Converter (MMC), which supplies driving power to the sub-module controller of an MMC connected to a High Voltage Direct Current (HVDC) system. The power supply apparatus includes a bridge circuit unit including N (N≥2, integer) energy storage units for storing a DC voltage in series-connected sub-modules in the MMC and multiple power semiconductor devices connected in parallel with the N energy storage units in a form of a bridge; and a DC/DC converter for converting a voltage output from output terminals formed between both ends of n (1≤n<N) series-connected energy storage units, among the N energy storage
(Continued)

units, into a low voltage and supplying the low voltage to the sub-module controller.

4 Claims, 5 Drawing Sheets

(51) Int. Cl.
*H02M 1/08* (2006.01)
*H02M 7/49* (2007.01)
H02M 1/00 (2006.01)
H02M 7/483 (2007.01)

(52) U.S. Cl.
CPC ............... *H02M 2001/0006* (2013.01); *H02M 2007/4835* (2013.01)

(58) Field of Classification Search
USPC ........................... 327/108, 112, 306; 363/16
See application file for complete search history.

(56) References Cited

FOREIGN PATENT DOCUMENTS

| | | | |
|---|---|---|---|
| JP | 08051770 | A | 2/1996 |
| JP | 4969614 | B2 | 4/2012 |
| JP | 2013-255422 | A | 12/2013 |
| KR | 10-1410731 | B1 | 6/2014 |
| WO | 2014-091801 | A1 | 6/2014 |

\* cited by examiner

POWER SUPPLY DEVICE FOR SUB-MODULE CONTROLLER OF MMC CONVERTER

TECHNICAL FIELD

The present invention generally relates to a power supply apparatus for a sub-module controller and, more particularly, to a power supply apparatus for a sub-module controller of a Modular Multilevel Converter (MMC), which supplies driving power to the sub-module controller of an MMC connected to a High Voltage Direct Current (HVDC) system.

BACKGROUND ART

Generally, in High Voltage Direct Current (HVDC) systems, Alternating Current (AC) power produced in a power plant is converted into DC power and the DC power is transmitted, and a power receiving stage re-converts the DC power into AC power and supplies the AC power to a load. Such an HVDC system is advantageous in that power may be efficiently and economically transmitted via voltage boosting, and in that connections between heterogeneous systems and long-distance high-efficiency power transmission are possible.

A Modular Multilevel Converter (MMC) is connected to an HVDC system to realize power transmission and reactive power compensation. In the MMC, multiple sub-modules are connected in series with each other. In the MMC, sub-modules are very important components and are controlled by a separately provided controller. To use the high voltage from sub-modules as driving power for the sub-module controller, there is required a power supply apparatus, which converts the high voltage into the low voltage required for the sub-module controller.

FIG. 1 is an equivalent circuit diagram of an MMC, and FIG. 2 is a circuit diagram of a conventional power supply apparatus for a sub-module controller of an MMC. As is well-known in the art, the MMC is composed of one or more phase modules 1, and multiple sub-modules 10 are connected in series with each other in each phase module 1. Further, respective DC voltage terminals of each phase module 1 are connected to positive (+) and negative (−) DC voltage buses P and N. A high DC voltage is present between the DC voltage P and N buses. In each sub-module 10, two connection terminals X1 and X2 are formed.

A conventional power supply apparatus 20 for the sub-module controller of the MMC includes an energy storage unit 21 and multiple series-connected resistors 22, connected in parallel with the energy storage unit 21, wherein a DC/DC converter 23 is connected to some of the series-connected resistors.

When the power supply apparatus 20 for the sub-module controller is applied to an MMC that is connected to an HVDC system, a high voltage of several to several tens of kV, stored in the energy storage unit 23, must be converted into a low voltage of several to several tens of V required for the sub-module controller. For this, in the conventional technology, a resistor voltage-dividing scheme using multiple resistors 22 connected in parallel with the energy storage unit 21 is used. That is, the voltage charged in the energy storage unit 21 is divided into voltages including a voltage across some resistor R3, among the multiple series-connected resistors R1 to R3, and is thus converted into a low voltage.

However, the conventional power supply apparatus 20 is problematic in that unnecessary loss occurs due to the use of the resistors R1 to R3 for voltage division.

DISCLOSURE

Technical Problem

An object of the present invention is to provide a power supply apparatus for a sub-module controller of an MMC, which minimizes unnecessary loss when multiple sub-modules in an MMC connected to an HVDC system receive an internal high voltage, convert the high voltage into a low voltage required to drive the sub-module controller, and supply the low voltage to the sub-module controller as control power.

Technical Solution

A power supply apparatus for a sub-module controller of a Modular Multilevel Converter (MMC) according to an embodiment of the present invention includes a bridge circuit unit including N (N≥2, integer) energy storage units for storing a DC voltage in series-connected sub-modules in the MMC and multiple power semiconductor devices connected in parallel with the N energy storage units in a form of a bridge; and a DC/DC converter for converting a voltage output from output terminals formed between both ends of n (1≤n<N) series-connected energy storage units, among the N energy storage units, into a low voltage and supplying the low voltage to the sub-module controller.

Further, a power supply apparatus for a sub-module controller of a MMC according to another embodiment of the present invention includes a bridge circuit unit including N (N≥2, integer) energy storage units for storing a DC voltage in series-connected sub-modules in the MMC, and multiple power semiconductor devices respectively connected in parallel with the N energy storage units in a form of a bridge and connected in series with each other; a switching unit for switching any one of a first output terminal formed at a first end of n (1≤n<N) series-connected energy storage units, among the N energy storage units, and a second output terminal formed at a first end of m (n<m≤N) series-connected energy storage units; and a DC/DC converter for converting a voltage, output through the first output terminal or the second output terminal depending on switching of the switching unit, into a low voltage, and supplying the low voltage to the sub-module controller.

In the present invention, the switching unit may be configured to perform switching to make a connection to the second output terminal during a period from an initial operation to a preset first voltage, thus enabling a voltage stored in the m energy storage units to be supplied to the DC/DC converter, and to change switching to make a connection to the first output terminal during a period after the first voltage, thus enabling a voltage stored in the n energy storage units to be supplied to the DC/DC converter.

In the present invention, the bridge circuit unit may include any one selected from a half-bridge circuit and a full-bridge circuit.

Advantageous Effects

According to the present invention, loss occurring in various types of components included in a power supply apparatus for sub-module controller in an MMC may be minimized.

Further, according to the present invention, efficiency much higher than that of the conventional power supply apparatus using voltage-dividing resistors may be realized.

BEST MODE

Figure 1:
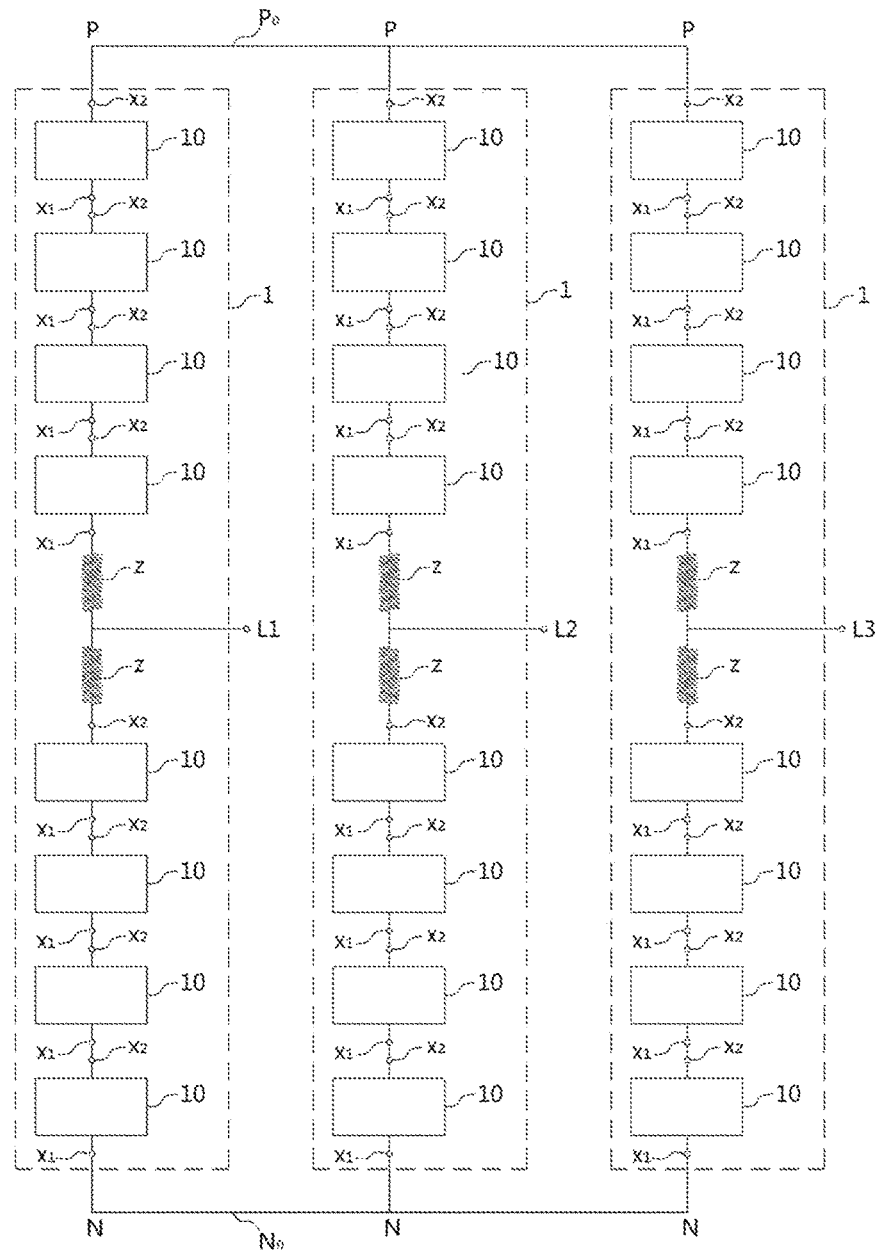
FIG. 1 is an equivalent circuit diagram of a typical MMC.
Figure 2:
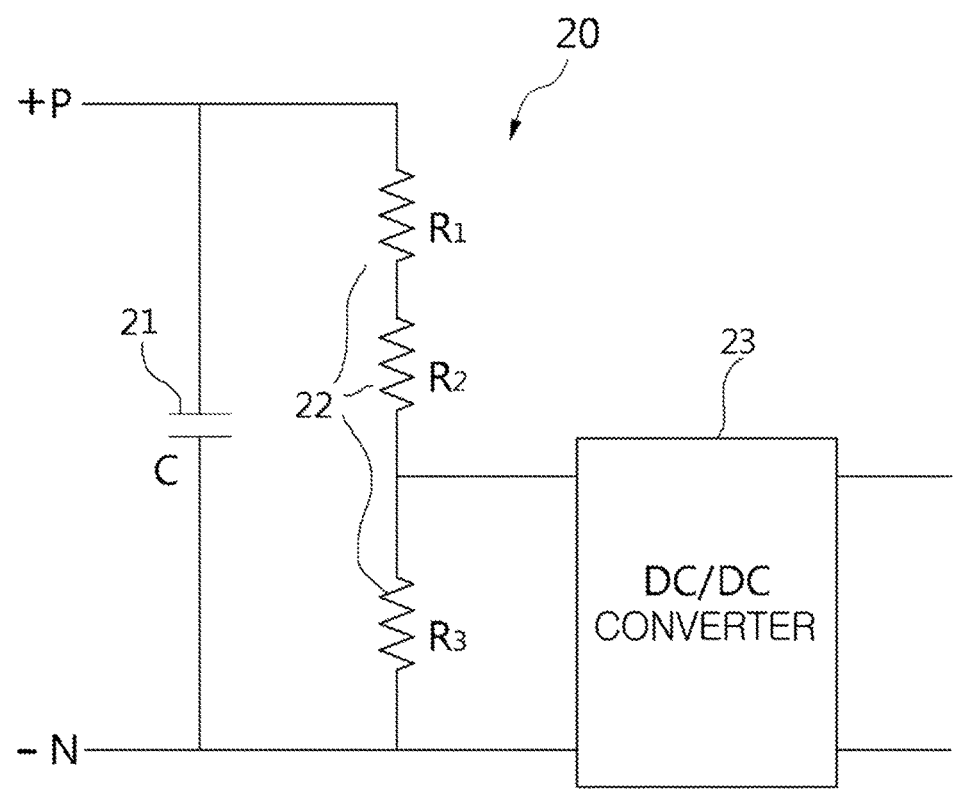
FIG. 2 is a circuit diagram showing a conventional power supply apparatus for a sub-module controller of an MMC.

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Further, terms such as "first", "second", "A", "B", "(a)", and "(b)" may be used to describe the components of the present invention. These terms are merely used to distinguish relevant components from other components, and the substance, sequence or order of the relevant components is not limited by the terms. It should be understood that a representation indicating that a first component is "linked", "coupled", or "connected" to a second component includes not only the case where the first component is directly coupled or connected to the second component but also cases where a third component is "linked", "coupled" or "connected" between the first and second components.

Figure 3A:
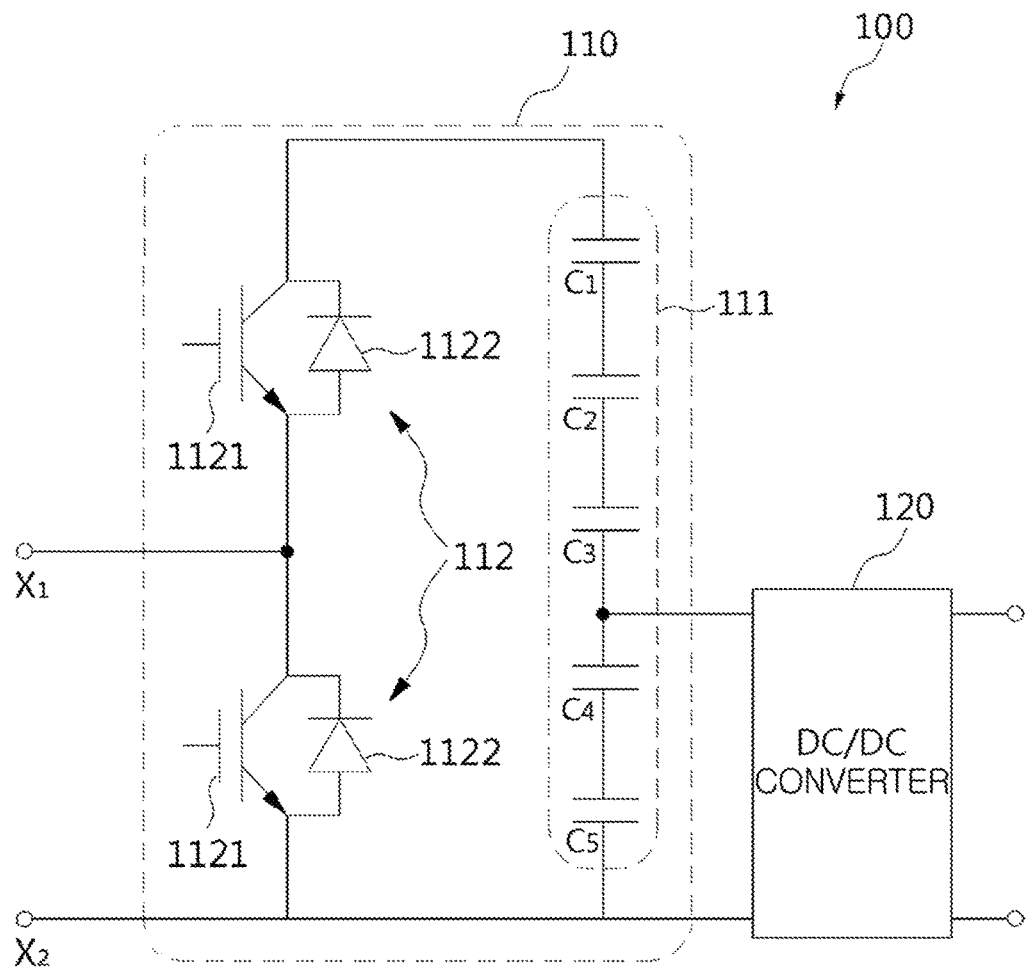
FIG. 3 is a circuit diagram showing a power supply apparatus for a sub-module controller of an MMC according to an embodiment of the present invention.
Figure 3B:
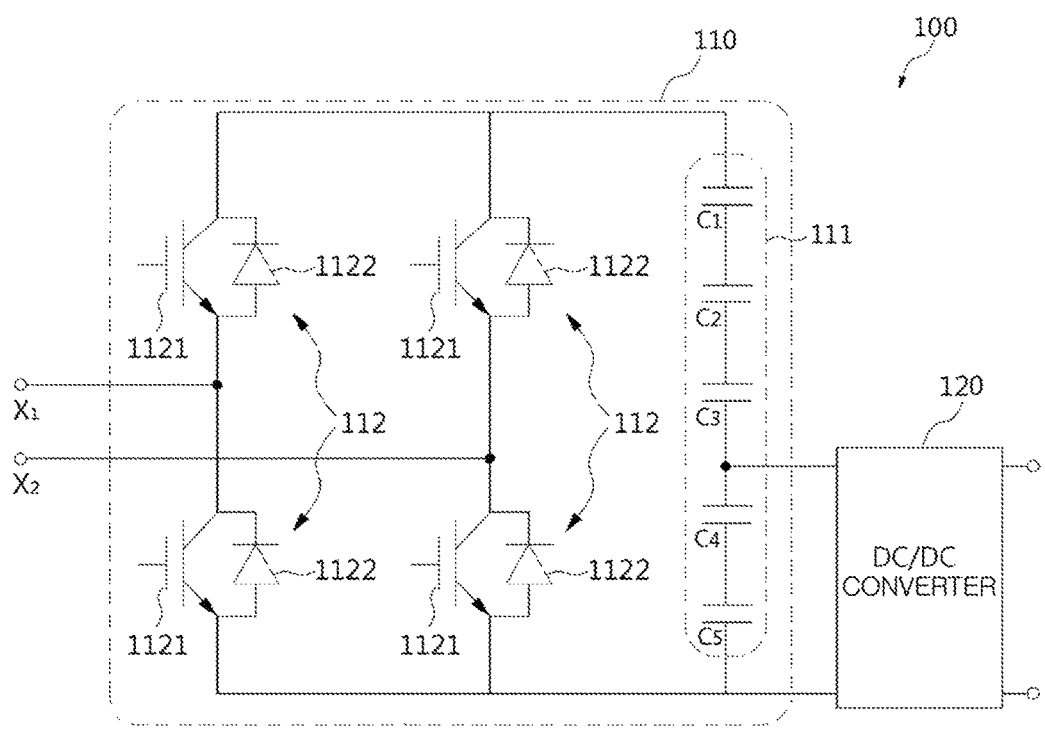

FIGS. 3a and 3b are circuit diagrams showing a power supply apparatus for a sub-module controller of an MMC according to an embodiment of the present invention.

A power supply apparatus 100 for a sub-module controller of an MMC according to the present embodiment is applied to an MMC having one or more phase modules. Each phase module includes multiple series-connected sub-modules, and DC voltage terminals thereof are connected to positive (+) and negative (−) DC voltage buses P and N, respectively. The multiple sub-modules are connected in series with each other through two input terminals X1 and X2, and store a DC voltage in energy storage units 111 connected in series with each other in the power supply apparatus. The operations of such sub-modules are controlled by a controller (not shown), and the power supply apparatus 100 according to the present invention is configured to convert a high voltage (several to several tens of kV), stored in the energy storage units 111, into a low voltage (several to several tens of V), and supply the low voltage to the sub-module controller as driving power.

The power supply apparatus 100 according to the embodiment of the present invention includes a bridge circuit unit 110 and a DC/DC converter 120.

The bridge circuit unit 110 includes N energy storage units 111 and multiple power semiconductor devices 112. The N (N≥2, integer) energy storage units 111 are mutually connected in series with each other to store DC voltages. The multiple power semiconductor devices 112 are connected in parallel with the N energy storage units 111 in the shape of a bridge. In the present embodiment, the bridge circuit unit 110 may include a half bridge circuit or a full bridge circuit. Further, each energy storage unit, which is a device for storing a DC voltage, may be implemented using, for example, a capacitor or the like. Each power semiconductor device 112, which is a device for switching the flow of current, may be implemented using, for example, an Insulated-Gate Bipolar Transistor (IGBT), a Field Effect Transistor (FET), or another transistor.

FIG. 3a illustrates an example in which N energy storage units 111 and multiple power semiconductor devices 112 constitute a half-bridge circuit, and FIG. 3b illustrates an example in which N energy storage units 111 and multiple power semiconductor devices 112 constitute a full-bridge circuit.

More specifically, in the example of the half-bridge circuit shown in FIG. 3a, the N energy storage units 111 are connected in series with each other, and two series-connected power semiconductor devices 112 are connected in parallel with the N series-connected energy storage units 111, thus constituting the half-bridge circuit. Each of the power semiconductor devices 112 includes a turn-on/turn-off controllable power semiconductor switch 1121 and a free-wheeling diode 1122 connected in parallel therewith. The turn-on/turn-off operation of each power semiconductor device 112 is controlled in response to a control signal from a control unit (not shown).

Further, a first input terminal X1 and a second input terminal X2 are formed between both ends of any one of the two power semiconductor devices 112 of the half-bridge circuit, and are connected in series with other sub-modules. Although the two power semiconductor devices 112 are illustrated as an example, the present invention is not limited thereto.

In the example of the full-bridge circuit shown in FIG. 3b, the N energy storage units 111 are connected in series with each other, and two pairs of series-connected power semiconductor devices 112 are connected in parallel with each other and are individually connected in parallel with the N series-connected energy storage units 111, thus constituting the full-bridge circuit. The power semiconductor devices 112 may be turned on/off in response to a control signal from a control unit (not shown). Further, the first input terminal X1 and the second input terminal X2 are formed at respective junctions of the power semiconductor devices 112, forming each pair, in the full-bridge circuit. Although four power semiconductor devices 112 are illustrated in the drawing as an example, the present invention is not limited thereto.

The DC/DC converter 120 is configured to convert a voltage across both ends of n (1≤n<N) series-connected energy storage units 111, corresponding to some of the N energy storage units 111, into a low voltage, and to supply the low voltage to a subsequent sub-module controller.

In the examples shown in FIGS. 3a and 3b, the half-bridge circuit and the full-bridge circuit are individually configured, on the assumption that N=5 is set for the convenience of description. As shown in the drawing, the half-bridge circuit includes five energy storage units 111 and two power semiconductor devices 112, and the full-bridge circuit includes five energy storage units 111 and two power semiconductor devices 112. The output terminals are formed at both ends of two (n=2) series-connected energy storage units, among the five energy storage units 111, and the DC/DC converter 120 receives the voltage output from the output terminals, converts the voltage into the low voltage required for the sub-module controller (not shown), and outputs the low voltage. In the above description, n=2 is only an example for description, and in FIG. 3(a), n may be any one integer from 1 to 4. Such a low-voltage conversion procedure is equally applied even to a full-bridge circuit.

In this way, the power supply apparatus 100 according to the embodiment of the present invention supplies driving power to the sub-module controller using high voltages stored in the multiple energy storage units 111 provided in the sub-modules in the MMC, but receives part of the high voltages stored in the multiple energy storage units 111 from the DC/DC converter 120, converts the corresponding high voltage into a low voltage, and supplies the low voltage as driving power to the sub-module controller. In this way, the problem of heat generation and loss occurring in the conventional technology due to the use of voltage-dividing resistors may be solved.

Figure 4:
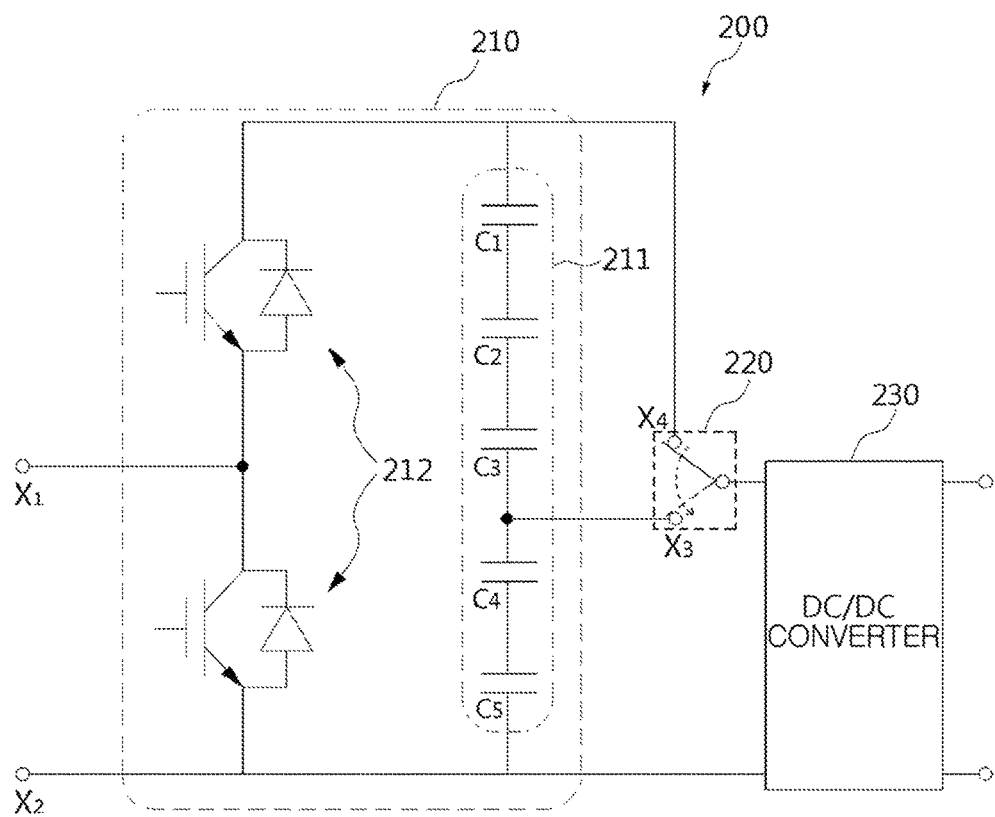
FIG. 4 is a circuit diagram showing a power supply apparatus for a sub-module controller of an MMC according to another embodiment of the present invention.

FIG. 4 is a circuit diagram showing a power supply apparatus for a sub-module controller of an MMC according to another embodiment of the present invention.

Referring to FIG. 4, a power supply apparatus 200 according to another embodiment of the present invention includes a bridge circuit unit 210, a switching unit 220, and a DC/DC converter 230.

The bridge circuit unit 210 and the DC/DC converter 230 are identical to the bridge circuit unit 110 and the DC/DC converter 120 of FIG. 3. Therefore, the bridge circuit unit 210 may be implemented as a half-bridge circuit or a full-bridge circuit using N energy storage units 211 and multiple power semiconductor devices 212. However, the power supply apparatus 200 shown in FIG. 4 differs slightly from the power supply apparatus 100 shown in FIG. 3 as to the position at which output terminals are formed. This will be described in detail later.

The power supply apparatus 200 according to another embodiment of the present invention further includes a switching unit 220 for switching the flow of current in the bridge circuit unit 210 and the DC/DC converter 230. Such a switching unit 220 performs switching so that any one of a first output terminal X3, formed at a first end of n ($1 \leq n < N$) series-connected energy storage units among N energy storage units 211 in the bridge circuit unit 210, and a second output terminal X4, formed at a first end of m ($n < m \leq N$) series-connected energy storage units, is connected to the DC/DC converter 230.

In the example shown in FIG. 4, a half-bridge circuit, in which N=5 is preset, is illustrated for the convenience of description. The half-bridge circuit includes five energy storage units 211 and two power semiconductor devices 212. Of course, as shown in FIG. 3, the bridge circuit unit 210 may be implemented as a full-bridge circuit. In this case, the first output terminal X3 is formed at the first end of two (n=2) series-connected energy storage units among five energy storage units 211, and the other second output terminal X4 is formed at the first end of five (m=N=5) series-connected energy storage units. Of course, in the above description, n=2 and m=5(N) are only examples for description, and, as another example, n may be any one integer from 1 to 4, and m may be any one integer from 2 to 5. However, it is preferable that m be greater than n. The reason for this is that, at a low DC voltage in initial operation, the DC/DC converter 230 converts the voltage of m energy storage units, in which a relatively high voltage is charged, into a low voltage, and at a high DC voltage generated after a predetermined period of time has elapsed, the DC/DC converter 230 converts the voltage of n energy storage units, in which a relatively low voltage is charged, into a low voltage.

Here, the switching unit 220 performs switching so that any one of the first output terminal X3, formed at the first end of two series-connected energy storage units, among five energy storage units 211, and the second output terminal X4, formed at the first end of the five series-connected energy storage units, is connected to the DC/DC converter 230. Here, preferably, switching is performed such that the second output terminal X4 is initially connected to the DC/DC converter 230 and such that, since then, the first output terminal X3 is connected to the DC/DC converter 230 at a predetermined time. More specifically, when the power supply apparatus 200 according to the present embodiment is applied to an MMC, the DC voltage of the sub-modules increases or decreases in a range from 0 V to a preset maximum voltage (Vmax). During a period from the initial operation of the power supply apparatus 200 to a preset first voltage, switching to make a connection to the second output terminal X4 is performed, so that the voltage stored in a relatively large number of series-connected energy storage units, that is, a relatively high voltage, is supplied to the DC/DC converter 230, thus enabling the supply of power to be stably performed. After the first voltage, switching is changed to make a connection to the first output terminal X3, so that the voltage stored in a relatively small number of series-connected energy storage units, that is, a relatively low voltage, is supplied to the DC/DC converter 230, thus reducing the high-voltage burden on the circuit. The DC/DC converter 230 converts the voltage supplied in this way into the low voltage required to drive the sub-module controller and supplies the low voltage to the sub-module controller.

In this way, the power supply apparatus 200 according to the embodiment of the present invention is configured to supply driving power to the sub-module controller using the high voltages, stored in the multiple energy storage units 211 provided in each MMC sub-module, wherein, during initial driving, the high voltage stored in a relatively large number of energy storage units 211 is supplied from the DC/DC converter 120 and is converted into a low voltage, and the low voltage is supplied to the sub-module controller as driving power, and wherein, since a predetermined time, a low voltage stored in a relatively small number of energy storage units 211 is supplied from the DC/DC converter 120 and is converted into a low voltage, and the low voltage is supplied to the sub-module controller as the driving power. In this way, the problem of heat generation and loss appearing in the conventional technology due to the use of voltage-dividing resistors may be solved.

In the above description, although a description has been made such that all components constituting embodiments of the present invention are combined into a single component or are operated with the components being combined with each other, the present invention is not limited to those embodiments. That is, within the scope of the present invention, one or more of all components may be selectively combined and operated. Further, it should be understood that terms such as "comprise", "include" or "have" are merely intended to indicate that the corresponding component is internally present, unless a description to the contrary is specifically pointed out in context, and are not intended to exclude the possibility that other components may be additionally included. Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

The above description is merely intended to exemplarily describe the technical spirit of the present invention, and those skilled in the art will appreciate that various changes and modifications are possible without departing from the essential features of the present invention. Therefore, the embodiments disclosed in the present invention are not intended to restrict the technical spirit of the present invention and are merely intended to describe the present invention, and the scope of the present invention is not limited by those embodiments. The protection scope of the present invention should be defined by the accompanying claims, and all technical spirit of equivalents thereof should be construed as being included in the scope of the present invention.

The invention claimed is:

1. A power supply apparatus for a sub-module controller of a MMC, comprising:
    a bridge circuit unit including N (N≥2, integer) energy storage units for storing a DC voltage in series-connected sub-modules in the MMC, and multiple power semiconductor devices respectively connected in parallel with the N energy storage units in a form of a bridge and connected in series with each other;
    a switching unit for switching any one of a first output terminal formed at a first end of n (1≤n<N) series-connected energy storage units, among the N energy storage units, and a second output terminal formed at a first end of m (n<m≤N) series-connected energy storage units; and
    a DC/DC converter for converting a voltage, output through the first output terminal or the second output terminal depending on switching of the switching unit, into a lower voltage than the output voltage, and supplying the lower voltage to the sub-module controller.

2. The power supply apparatus of claim 1, wherein the switching unit is configured to perform switching to make a connection to the second output terminal during a period from an initial operation to a preset first voltage, thus enabling a voltage stored in the m energy storage units to be supplied to the DC/DC converter, and to change switching to make a connection to the first output terminal during a period after the first voltage, thus enabling a voltage stored in the n energy storage units to be supplied to the DC/DC converter.

3. The power supply apparatus of claim 1, wherein the bridge circuit unit comprises any one selected from a half-bridge circuit and a full-bridge circuit.

4. The power supply apparatus of claim 2, wherein the bridge circuit unit comprises any one selected from a half-bridge circuit and a full-bridge circuit.

* * * * *